United States Patent [19]

Gladden

[11] 4,124,409
[45] Nov. 7, 1978

[54] PNEUMATIC BULK MATERIAL REMOVAL APPARATUS AND METHOD

[76] Inventor: James B. Gladden, 7260 Duncourtney Dr., Atlanta, Ga. 30328

[21] Appl. No.: 732,004

[22] Filed: Nov. 5, 1976

[51] Int. Cl.$^2$ ............................ B08B 5/04; A47L 5/38
[52] U.S. Cl. .......................................... 134/21; 15/302; 55/191; 15/322
[58] Field of Search ................. 55/191, 204, 315, 345, 55/257 C, 229; 15/340, 353, 352, 415 R, 302, 322, 326; 134/21

[56] References Cited

U.S. PATENT DOCUMENTS

| | | | |
|---|---|---|---|
| 2,656,895 | 10/1953 | Kasehagen | 183/2.7 |
| 3,842,461 | 5/1973 | Wurster | 15/326 |
| 3,959,010 | 9/1974 | Thompson | 134/21 |

Primary Examiner—Leon S. Bashore
Assistant Examiner—Chris Konkol
Attorney, Agent, or Firm—Newton, Hopkins & Ormsby

[57] ABSTRACT

Large amounts of industrial wastes are drawn by high vacuum into a scrubber and separator unit at the entrance of which the bulk wastes are flooded with water and reduced to slurry form. In the separator, the slurry is centrifugally spun and separated from the entraining air and delivered by gravity into a slurry tank from which the slurry is pumped to a remote disposal site. The air passes from the separator to a surge chamber where the air is spun and expanded and ridded of entrained moisture. The dry air in a clean state after passing serially through the vacuum producer and a silencer is expelled to the atmosphere. The equipment can be mounted on a vehicular base. The apparatus can operate to continuously and simultaneously remove and dispose of industrial wastes.

11 Claims, 17 Drawing Figures

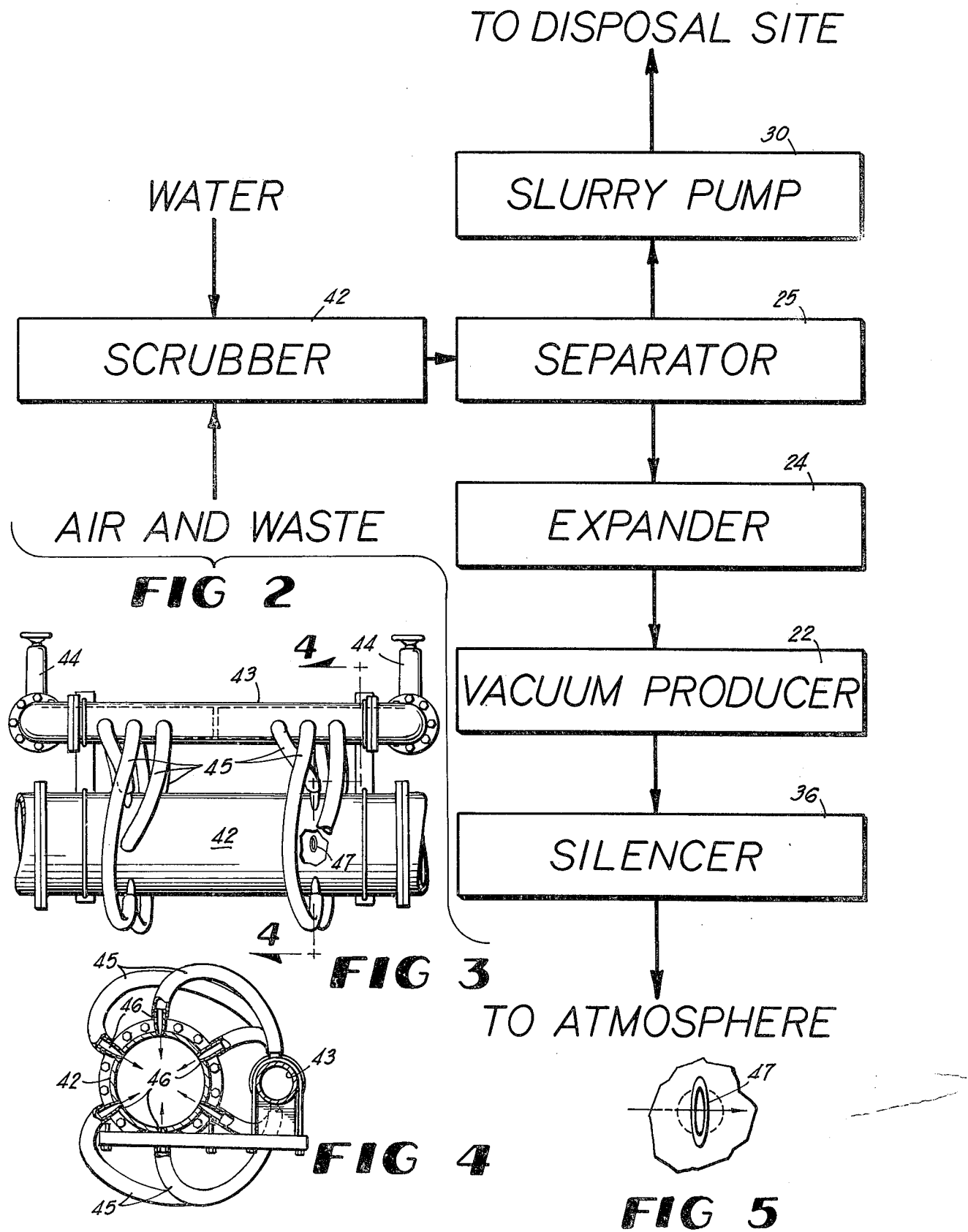

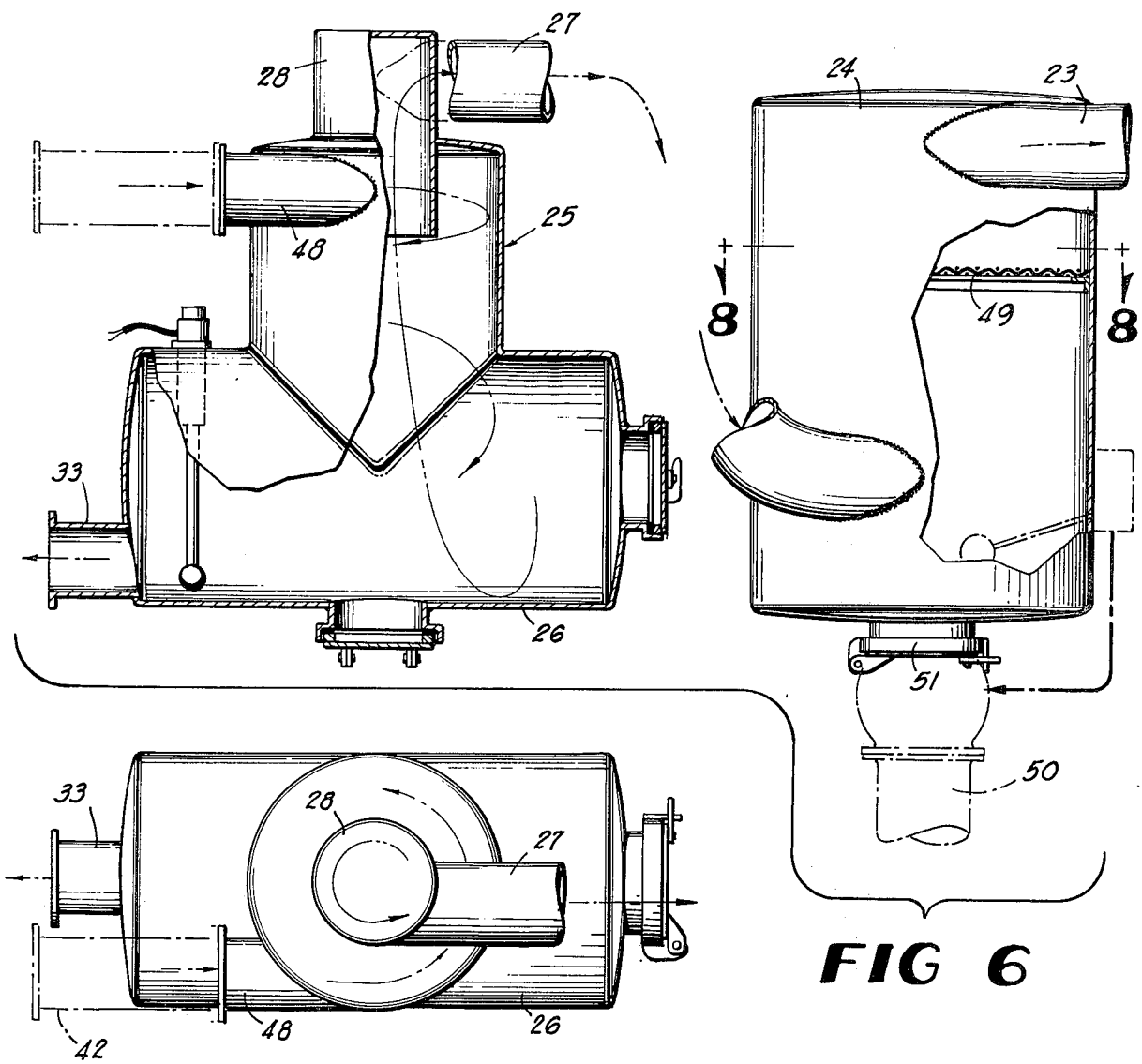
FIG 7
FIG 6
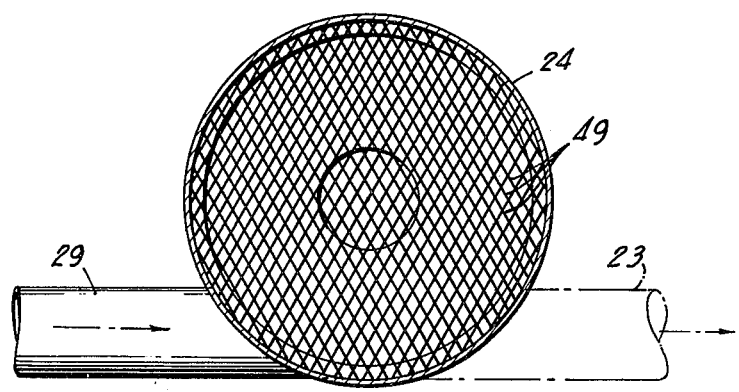
FIG 8

PNEUMATIC BULK MATERIAL REMOVAL APPARATUS AND METHOD

BACKGROUND OF THE INVENTION

Vacuum operated industrial waste collection and disposal apparatus is broadly known in the prior art. Some examples of the patented prior art are disclosed by U.S. Pat. Nos. 3,541,631 and 3,842,461. In the latter patent issued to Wurster, incoming solid materials entrained in a suction air stream are recognized to contain a high liquid content in some instances and the apparatus disclosed is adapted to handle both dry or wet solid waste materials. Some of the drawbacks of the known prior art are set forth in the text of the Wurster patent. The chief drawback of the prior art is inefficiency caused by the fact that waste collection machines collect debris in some form of trap chamber and the machine must be shut down periodically to dump or clean out this chamber. In some systems, almost half of the time during use is consumed by cleaning or dumping. Another prior art deficiency is the absence of an effective hose and pipe coupling of simplified construction, yet rugged enough to withstand the industrial use and abuse which is inevitable in practice. In most cases, bolted flanges or slip joints held together by clamping rings are employed. Repeated coupling and uncoupling rapidly causes damage to these customary coupling structures.

The objective of the present invention is to improve on the known prior art, including the Wurster patent, in terms of a more efficient and more economical apparatus and method which can dispose more expeditiously of greater amounts of industrial or other bulk wastes. Some applications of the invention include the removal of flyash from coal fired boiler penthouses, removal of bulk wastes from steel mills, foundries, paper mills and the like.

A key feature of the method and apparatus embodying the present invention involves flooding the solid waste material with water as it is taken into the apparatus to create a waste slurry, as distinguished from merely dampening the dry waste. The slurry is then spun in a separator to remove air, and the slurry drops into a tank where it is continually pumped to a suitable remote disposal site. The air, upon leaving the separator, enters a surge chamber where it is spun, expanded and further dried and the dry clean air then passes through a positive displacement vacuum producer and then serially through a silencer to atmosphere. The system is designed to remove vast amounts of waste material from confined spaces and elsewhere. The apparatus is preferably on a vehicular base but can be stationary.

Various features and details of the invention will become apparent during the course of the following description.

BRIEF DESCRIPTION OF THE DRAWINGS

FIG. 2 is a flow chart or schematic showing the sequence of method steps.

FIG. 3 is a fragmentary elevational view of a waste material scrubber and water injection means to flood the material and form a slurry.

FIG. 4 is a vertical section taken on line 4—4 of FIG. 3.

FIG. 5 is a fragmentary elevational view of an elliptical nozzle orifice in the water injection means.

FIG. 6 is a fragmentary composite elevational view of a slurry and air separator and an associated expander or surge chamber.

FIG. 7 is a plan view of the separator in FIG. 6.

FIG. 8 is a horizontal section taken on line 8—8 of FIG. 6.

DETAILED DESCRIPTION

Figure 1:
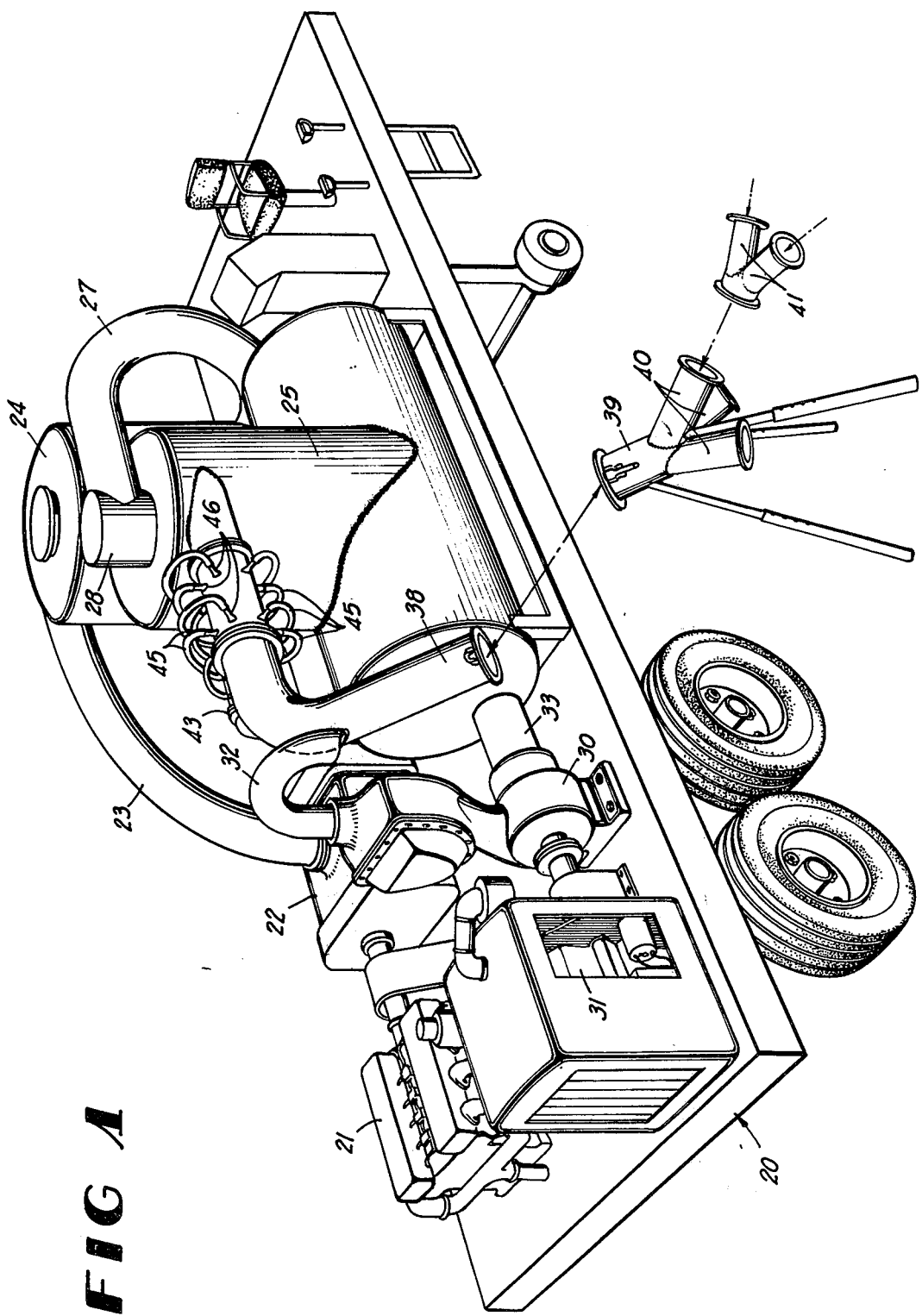
FIG. 1 is a perspective view of a pneumatic bulk or waste material removal apparatus employed in the practice of the method.
Figure 1A:
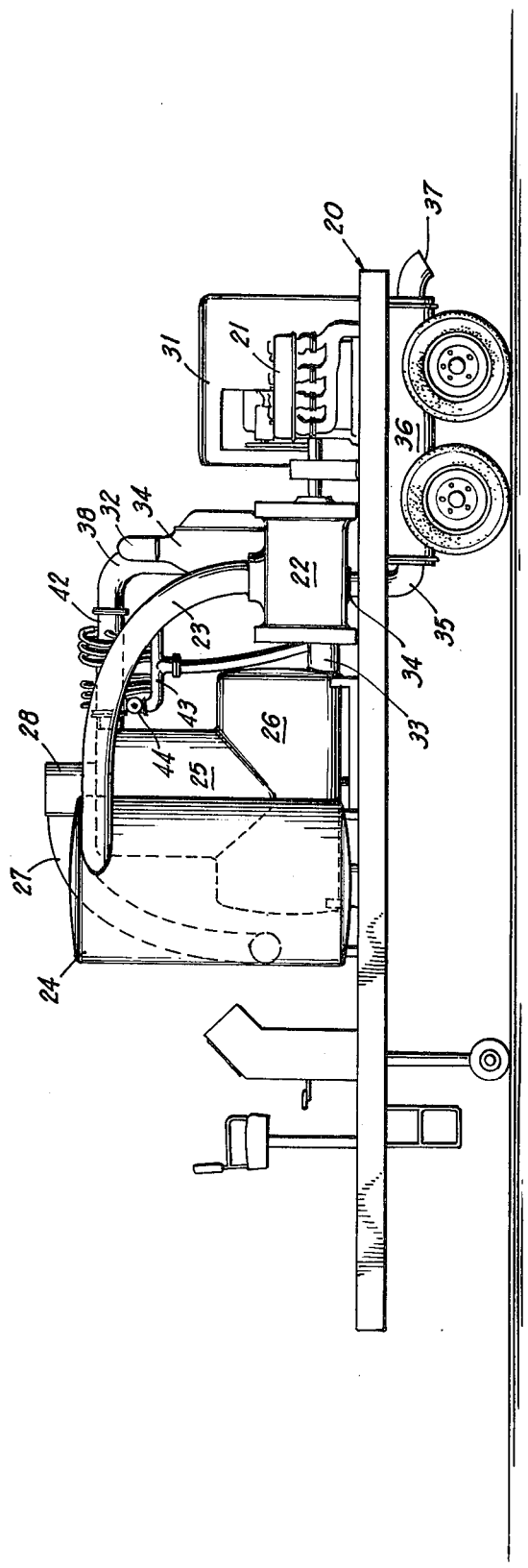
FIG. 1A is a side elevational view of the apparatus showing the side remote from that visible in FIG. 1.
Figure 9:
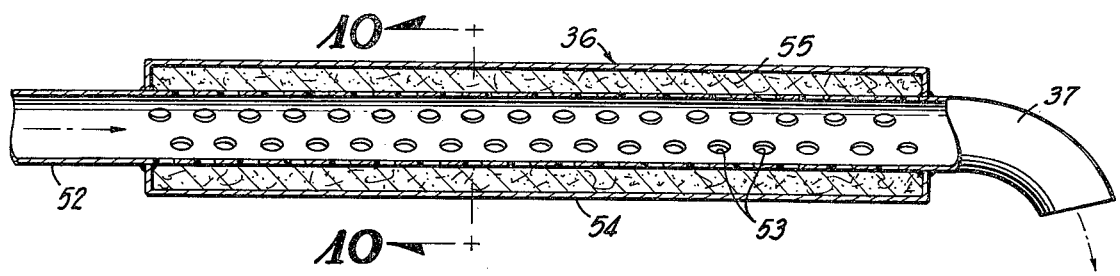
FIG. 9 is a central vertical cross section through a silencer at the air discharge end of the system.
Figure 10:
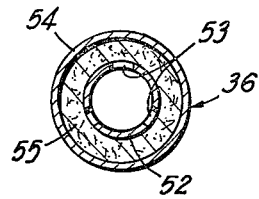
FIG. 10 is a transverse vertical cross section taken on line 10—10 of FIG. 9.

Referring to the drawings in detail wherein like numerals designate like parts, the apparatus or system as a whole is shown in FIGS. 1 and 1A and comprises a vehicular base 20 for the support of several major apparatus units. More particularly, the apparatus on the vehicular base 20 includes an engine 21, such as a diesel engine, operatively coupled to and driving a large capacity positive displacement vacuum producer or pump 22. The intake of vacuum pump 22 is coupled with a clean and dry air conduit 23 leading from the top of a large surge chamber 24 where air is expanded and dried following its separation from a water slurry of solid waste material.

An air separator 25 of the centrifugal type is integrated with a slurry collecting tank 26 on the base 20, and a delivery conduit 27 leading from the top or dome 28 of the separator 25 conveys air laden with some moisture to the intake 29 of the surge chamber or air expander 24.

A large centrifugal pump 30 on the base 20, driven by another engine 31, delivers a slurry of solid waste material and water through a discharge conduit 32 to a remote disposal site which can be several thousand feet from the apparatus. The pump 30 is coupled to the slurry tank 26 by a short conduit 33.

As best shown in FIG. 1A, after the dry clean air leaves the exhaust of the large vacuum pump 22 below the base 20 at 34 it passes through a conduit 35 to a silencer 36 and from this silencer to the atmosphere at 37.

The apparatus additionally comprises a bulk waste material inlet conduit 38 of comparatively large diameter, such as ten or more inches, coupled with a multiple line connector 39 of the same diameter having plural branch connectors 40 of somewhat reduced diameter, each of which in turn are coupled to further branch connectors 41 of lesser diameter. The connectors 41 are adapted to be coupled to flexible waste material pick-up conduits of sufficient length to reach into remote confined spaces in various industrial plants.

The waste inlet conduit 38 delivers the dry bulk waste to a horizontal axis scrubber 42 which also reduces the waste to a slurry by flooding it in the scrubber with water delivered by a water injection means 43 having throttle valves 44. The injection means or manifold 43 delivers water to the scrubber 42 through multiple hoses 45 to a corresponding number of circumferentially spaced injection nozzles 46 on the scrubber in two groups, as shown in FIG. 3. The water can be taken from any raw water source and is injected at an average rate of 600 gallons per minute. This rate of water flow can flood up to 2 cubic yards per minute of solid waste material such as fly ash. The nozzle orifices are preferably elliptically formed as indicated at 47 in FIG. 5. The waste scrubber and slurry former 42 is coupled by a fitting 48 to the top portion of centrifugal separator 25 tangentially thereof. As shown in FIG. 4, the several radial nozzles 46 inject pressure streams of water toward the center of the bore of the large diameter horizontal axis cylindrical scrubber 42 to convert the dry waste into a slurry, immediately before entry of the slurry into the centrifugal separator 25.

In connection with the operation of the system, it should be clearly understood that except for the operation of the pump 30 in discharging waste slurry through the conduit 32, all of the components are motivated by the large vacuum producer 22, including the centrifugal spinning activity in the separator 25 and in the expander or surge unit 24, as well as the final expulsion of clean dry air from the exhaust of pump 22 through silencer 36 to the atmosphere.

Further, in connection with the centrifugal separator 25, the powerful vacuum stream throughout the system from the inlet conduit 38 to the final air outlet 37 induces a strong centrifugal spinning of the slurry in the vertical axis separator chamber 25. Air laden with some moisture is drawn off from the dome 28 through conduit 27 while the slurry settles into the tank 26 to be pumped out through conduit 33 and delivered through conduit 37 to the remote disposal site.

In the expander 24, the air is again spun centrifugally in the vertical axis chamber and a filtering screen 49 between the inlet and outlet conduits 29 and 23 removes any solids which might possibly be entrained in the air stream. The expanding air also gives up virtually all remaining moisture and substantially dry air is delivered from the expander 24 to the inlet of vacuum pump 22. Moisture and/or solids in the bottom of the expander 24 can be removed through a suitable conduit 50 coupled at 51 to the expander.

The silencer 36 embodies a central axial pipe 52 having spaced staggered apertures 53 of approximately 3 inches in diameter. A concentric imperforate sleeve 54 surrounds the conduit 52 with the intervening chamber packed tightly with fiberglass 55. The arrangement effectively deadens sound.

FIGS. 11 through 16 depict a preferred type of conduit coupling means which may be conveniently employed in the apparatus to couple the various rigid and flexible conduits which are employed. Several variants of the coupling means are illustrated in the drawings, and, if preferred, different forms of coupling devices may be employed. The arrangements illustrated are convenient and efficient but the invention is in no way limited to these forms.

Figure 11:
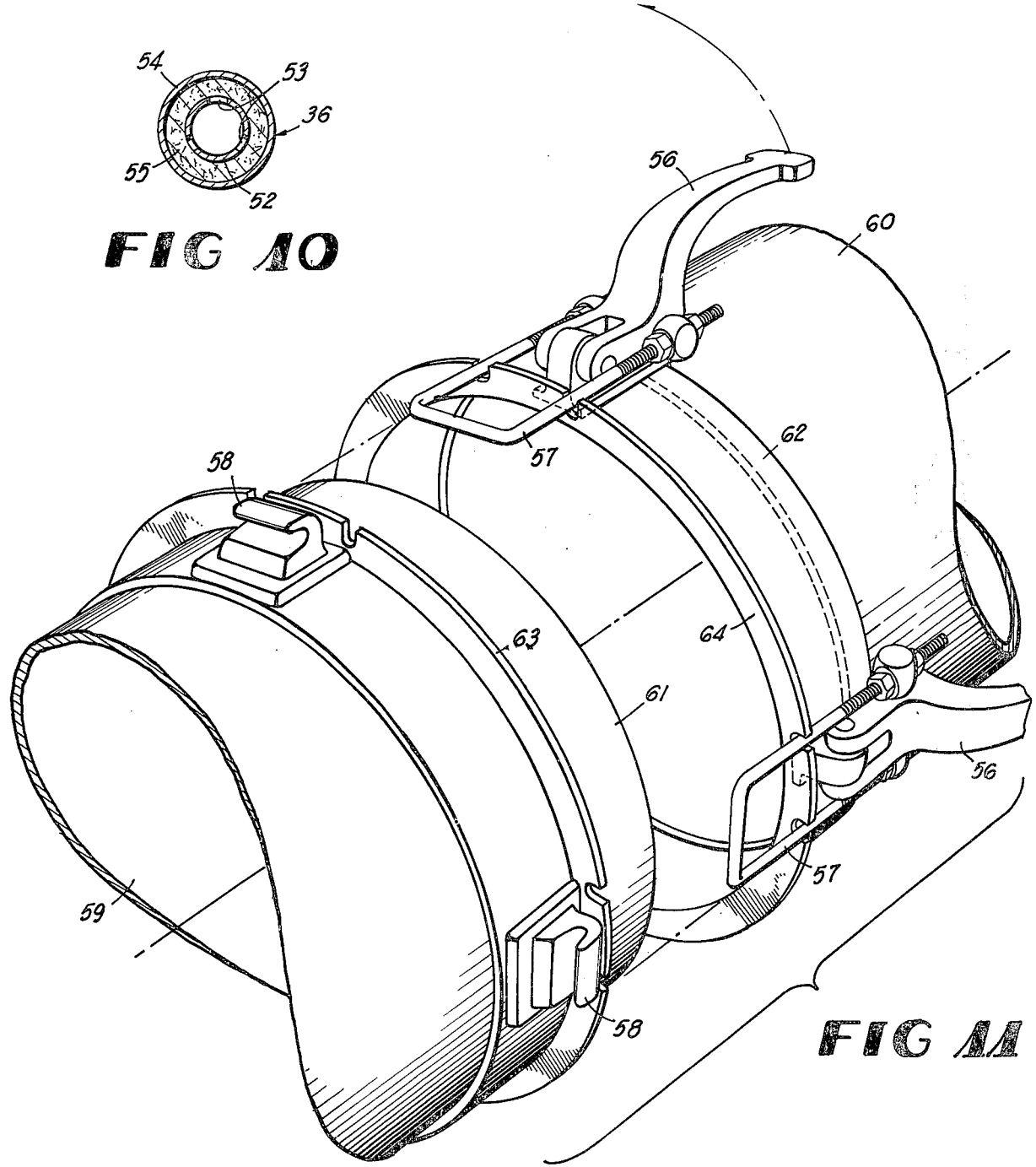
FIG. 11 is a fragmentary perspective view of a preferred form of conduit coupling means for the apparatus.

Briefly, in FIG. 11 as well as FIGS. 12 to 16, an over-center fulcrum and lever-type latching arrangement for conduits is shown. Usually, three latch units spaced apart 120° circumferentially are used. Each latch employs a pivoted lever 56 and adjustable length yoke or bail 57 in conjunction with a rigid retaining hook 58 on the opposing conduit section 59 to be coupled with a conduit section 60. Telescoping male and female end fittings 61 and 62 having abutting flanges 63 and 64, FIG. 11, may be conveniently employed. This coupling arrangement may be conveniently utilized throughout the apparatus to quickly couple the various conduits and provide for quick separation thereof.

Figure 12:
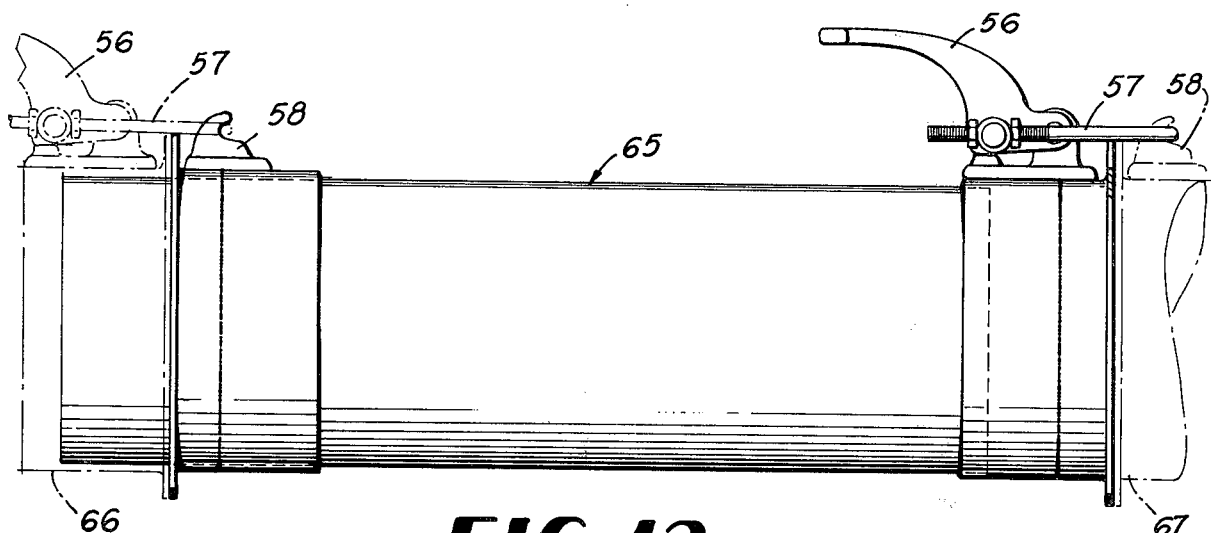
FIG. 12 is a side elevational view of a prefabricated coupling unit with male and female coupling ends.

FIG. 12 merely shows a prefabricated coupling pipe section 65 for joining a pair of conduits 66 and 67 by the latch means described in FIG. 11.

Figure 13:
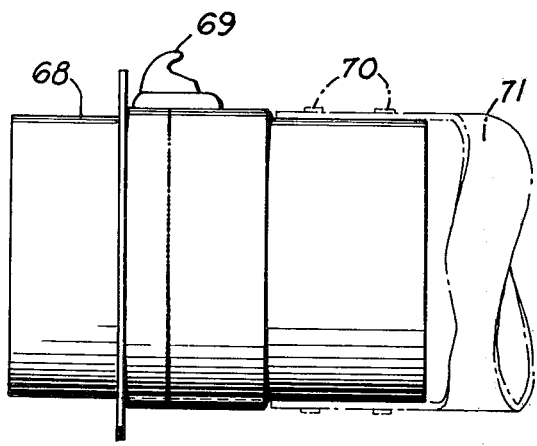
FIGS. 13 to 16 inclusive show variants of the conduit coupling means.

FIG. 13 embodies a shank type adapter male end 68 having a latch hook 69, and the shank can be banded as at 70 to a flexible hose 71.

Figure 14:
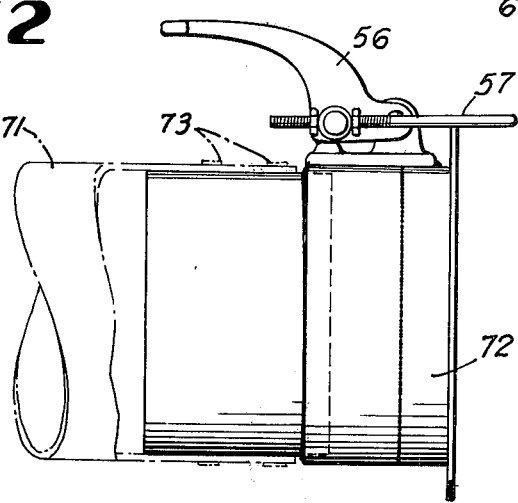

FIG. 14 illustrates the matching female shank 72 having lever 56 and bail 57 thereon and banded at 73 to the opposite end of hose 71.

Figure 15:
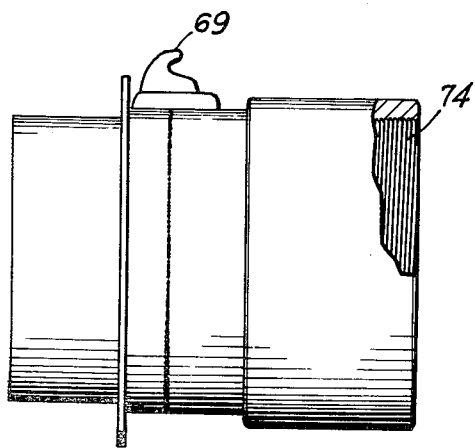

FIG. 15 is similar to FIG. 13 but embodies an internally threaded collar 74 to receive a threaded pipe.

Figure 16:
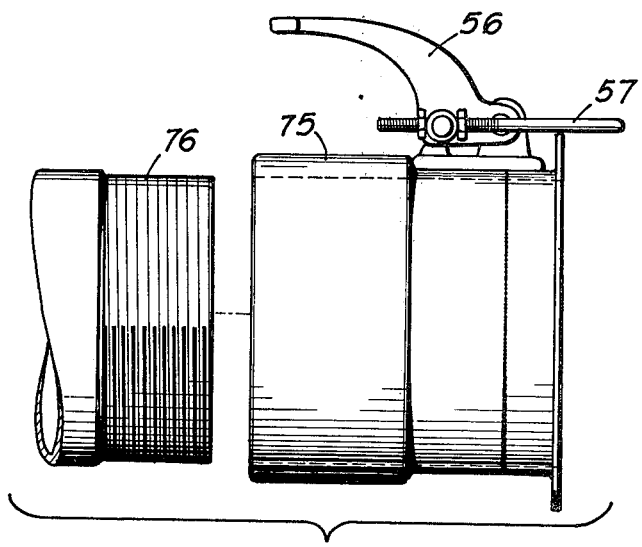

FIG. 16 is similar to FIG. 14 and also has a threaded collar 75 to receive the other threaded end 76 of the pipe.

While the foregoing description of apparatus has essentially described the method of removing bulk waste efficiently, the method carried out by the apparatus may be briefly summarized as follows.

Under continuous high vacuum produced by the pump 22 constantly driven by engine 21, solid waste is drawn in through conduit 38 from multiple line connector 39 and the solid waste enters scrubber 42 where it is instantly flooded with water and converted to a slurry.

The slurry is then drawn by suction into the centrifugal separator 25 and spun therein. The liquid slurry will descend into the tank 26 and separated air with some moisture exits through conduit 27 to the bottom of expander or surge unit 24.

The slurry in tank 26 is delivered by pump 30 to discharge conduit 32 leading to a remote disposal point.

The air is expanded and dried in the unit 24 by further centrifugal spinning and is drawn from the top of the expander through conduit 23 to the vacuum pump 22 in a clean dry state. The air is exhausted from pump 22 to conduit 35, FIG. 1A, and serially arranged silencer 36 from which the clean air exhausts to the atmosphere.

It has been discovered as the key feature of the method that the efficient separation of solids and moisture from the air stream is enhanced greatly by the initial formation of inducted solids in the air stream to a water slurry form, as fully described, as contrasted with a mere dampening of solids or attempting to separate the solids from a dry air stream. The invention works equally well with dry wastes of all types or wastes which already have a high moisture content. No material accumulates in the system and there is never a need to shut down the system for dumping or cleaning out a solids collection chamber or the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of continuously removing bulk industrial wastes from locations of waste accumulation and continuously disposing of the waste comprising the steps of continuously applying suction to a solid waste inlet conduit, delivering the waste from said inlet conduit to a scrubber and flooding the solid waste within the scrubber with water to thereby reduce the waste to slurry form, centrifugally separating air from the waste slurry by utilizing said suction to induce spinning of the slurry, pumping the separated slurry to a remote disposal site, expanding the air separated from the slurry by utilizing said suction to induce the expansion and thereby drying and cleansing the air, and exhausting the dried and cleansed air to the atmosphere.

2. The method of claim 1, and said expanding of the air comprising spinning the air in a surge chamber with the spinning induced by said suction.

3. The method of claim 1, and the additional step of directing the dried and cleansed air through a silencer following expansion of the air and prior to delivering it to atmosphere.

4. The method of claim 1, and the additional step of delivering separated slurry by gravity to a slurry holding tank prior to said pumping.

5. An apparatus for continuously removing bulk industrial waste material from locations of waste accumulation and continuously disposing of the waste material, comprising a bulk waste material intake conduit, a bulk waste scrubber connected with said intake conduit at the end remote from the end receiving the waste material a water flooding means connected with said scrubber and delivering water continuously to the scrubber to transform solid waste material therein to a slurry, a slurry and air separator connected to said scrubber, a pump means connected with said separator to remove separated waste slurry therefrom for delivery to a disposal site, an air expander connected with said separator and receiving separated air from the separator, and a vacuum producer connected with said air expander and including exhaust conduit means delivering dried and cleansed air to the atmosphere, said vacuum producer operable to continuously and simultaneously draw bulk waste material into and through said intake conduit and through said scrubber and draw said slurry into said separator and draw separated air from said separator into said expander.

6. The apparatus as defined in claim 5, and a prime mover coupled to said vacuum producer to operate it continuously.

7. The apparatus as defined in claim 5, and said water flooding means comprising a multiplicity of water injection nozzles coupled into said scrubber, and a water supply manifold common to said nozzles and delivering pressurized water to all of the nozzles simultaneously.

8. The apparatus as defined in claim 5, and a branched connector coupled to said bulk waste intake conduit whereby waste may be delivered to the intake conduit through plural flexible conduits having their intakes positioned at remote waste accumulation points.

9. The apparatus as defined in claim 5, and said slurry and air separator comprising a vacuum operated upright axis centrifugal separator chamber and a lower connected slurry accumulation tank which receives slurry by gravity from the separator chamber, said pump means connected to said slurry accumulation tank.

10. The apparatus as defined in claim 5, and said exhaust conduit means having a silencer coupled therein downstream from said vacuum producer.

11. The apparatus as defined in claim 5, and a first prime mover coupled to said vacuum producer to operate it continuously, and a second prime mover coupled to said pump means to operate it.

* * * * *